(12) United States Patent
Hauck et al.

(10) Patent No.: US 10,915,551 B2
(45) Date of Patent: Feb. 9, 2021

(54) CHANGE MANAGEMENT FOR SHARED OBJECTS IN MULTI-TENANCY SYSTEMS

(71) Applicant: SAP SE, Walldorf (DE)

(72) Inventors: Ralf-Juergen Hauck, Heidelberg (DE); Ulrich Auer, Hockenheim (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 213 days.

(21) Appl. No.: 15/996,804

(22) Filed: Jun. 4, 2018

(65) Prior Publication Data

US 2019/0370377 A1 Dec. 5, 2019

(51) Int. Cl.
*G06F 16/22* (2019.01)
*G06F 16/27* (2019.01)

(52) U.S. Cl.
CPC .......... *G06F 16/27* (2019.01); *G06F 16/2282* (2019.01)

(58) Field of Classification Search
None
See application file for complete search history.

(56) References Cited

U.S. PATENT DOCUMENTS

| 7,191,160 | B2 | 3/2007 | Hoeft et al. |
| 7,302,678 | B2 | 11/2007 | Bohlmann et al. |
| 7,325,233 | B2 | 1/2008 | Kuck et al. |
| 7,392,236 | B2 | 6/2008 | Rusch et al. |
| 7,421,437 | B2 | 9/2008 | Hoeft et al. |
| 7,457,828 | B2 | 11/2008 | Wenner et al. |
| 7,461,097 | B2 | 12/2008 | Stahl et al. |
| 7,480,681 | B2 | 1/2009 | Fecht et al. |
| 7,490,102 | B2 | 2/2009 | Ivanova et al. |
| 7,519,614 | B2 | 4/2009 | Glania et al. |
| 7,523,142 | B2 | 4/2009 | Driesen et al. |
| 7,565,443 | B2 | 7/2009 | Rossmanith et al. |
| 7,571,164 | B2 | 8/2009 | Kuersch et al. |
| 7,587,705 | B2 | 9/2009 | Benjes et al. |

(Continued)

FOREIGN PATENT DOCUMENTS

| WO | WO 2013/132377 A1 | 9/2013 |
| WO | WO 2016/049576 A1 | 3/2016 |

OTHER PUBLICATIONS

Non-final office action issued in U.S. Appl. No. 15/794,381 dated Nov. 6, 2019, 46 pages.

(Continued)

*Primary Examiner* — Tuankhanh D Phan
(74) *Attorney, Agent, or Firm* — Fish & Richardson P.C.

(57) ABSTRACT

Methods, systems, and computer-readable storage media for, in response to initiation of a deployment to a multi-tenant system, cloning a shared table in a shared container of a database system to provide a cloned table, the shared table corresponding to a plurality of table views in respective tenant containers, providing, within each tenant container of the tenant containers, an updated view to the cloned table, for a data object of the deployment, determining a previous location of the data object within the database system from an object catalog, and a new location of the data object within the database system from a deploy file, and storing the data object in one of the shared container, and a tenant container of a respective tenant based on one or both of the previous location, and the new location of the data object.

20 Claims, 5 Drawing Sheets

(56) References Cited

U.S. PATENT DOCUMENTS

| | | |
|---|---|---|
| 7,631,303 B2 | 12/2009 | Debertin et al. |
| 7,634,771 B2 | 12/2009 | Benjes et al. |
| 7,647,251 B2 | 1/2010 | Baeuerle et al. |
| 7,650,597 B2 | 1/2010 | Bohlmann et al. |
| 7,657,575 B2 | 2/2010 | Eberlein et al. |
| 7,669,181 B2 | 2/2010 | Benjes et al. |
| 7,693,851 B2 | 4/2010 | Becker |
| 7,702,696 B2 | 4/2010 | Ziegler et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,774,319 B2 | 8/2010 | Schweigkoffer et al. |
| 7,788,319 B2 | 8/2010 | Schmidt et al. |
| 7,797,708 B2 | 9/2010 | Weber et al. |
| 7,844,659 B2 | 11/2010 | Baeuerle et al. |
| 7,894,602 B2 | 2/2011 | Mueller et al. |
| 7,934,219 B2 | 4/2011 | Baeuerle et al. |
| 7,962,920 B2 | 6/2011 | Gabriel et al. |
| 7,971,209 B2 | 6/2011 | Eberlein et al. |
| 8,005,779 B2 | 8/2011 | Baeuerle et al. |
| 8,069,184 B2 | 11/2011 | Becker et al. |
| 8,108,433 B2 | 1/2012 | Baeuerle et al. |
| 8,108,434 B2 | 1/2012 | Schlarb et al. |
| 8,126,919 B2 | 2/2012 | Eberlein |
| 8,200,634 B2 | 6/2012 | Driesen et al. |
| 8,214,382 B1 | 7/2012 | Biere et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,315,988 B2 | 11/2012 | Glania et al. |
| 8,356,010 B2 | 1/2013 | Driesen |
| 8,356,056 B2 | 1/2013 | Schlarb et al. |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,413,150 B2 | 4/2013 | Lu et al. |
| 8,429,668 B2 | 4/2013 | Kowalkiewicz et al. |
| 8,434,060 B2 | 4/2013 | Driesen et al. |
| 8,467,817 B2 | 6/2013 | Said et al. |
| 8,473,515 B2 * | 6/2013 | Cotner ............ G06F 16/256 707/782 |
| 8,473,942 B2 | 6/2013 | Heidel et al. |
| 8,479,187 B2 | 7/2013 | Driesen et al. |
| 8,484,167 B2 | 7/2013 | Glania et al. |
| 8,489,640 B2 | 7/2013 | Schlarb et al. |
| 8,504,980 B1 | 8/2013 | Kraft et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,612,927 B2 | 12/2013 | Brunswig et al. |
| 8,645,483 B2 | 2/2014 | Odenheimer et al. |
| 8,683,436 B2 | 3/2014 | Baeuerle et al. |
| 8,694,557 B2 | 4/2014 | Thimmel et al. |
| 8,706,772 B2 | 4/2014 | Hartig et al. |
| 8,719,826 B2 | 5/2014 | Baeuerle et al. |
| 8,751,437 B2 | 6/2014 | Teichmann et al. |
| 8,751,573 B2 | 6/2014 | Said et al. |
| 8,762,408 B2 | 6/2014 | Brand et al. |
| 8,762,731 B2 | 6/2014 | Engler et al. |
| 8,762,929 B2 | 6/2014 | Driesen |
| 8,769,704 B2 | 7/2014 | Peddada et al. |
| 8,793,230 B2 | 7/2014 | Engelko et al. |
| 8,805,986 B2 | 8/2014 | Driesen et al. |
| 8,812,554 B1 | 8/2014 | Boulanov |
| 8,819,075 B2 | 8/2014 | Schlarb et al. |
| 8,850,432 B2 | 9/2014 | McGrath et al. |
| 8,856,727 B2 | 10/2014 | Schlarb et al. |
| 8,863,005 B2 | 10/2014 | Lehr et al. |
| 8,863,097 B2 | 10/2014 | Thimmel et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,886,596 B2 | 11/2014 | Effern et al. |
| 8,892,667 B2 | 11/2014 | Brunswig et al. |
| 8,904,402 B2 | 12/2014 | McGrath et al. |
| 8,924,384 B2 | 12/2014 | Driesen et al. |
| 8,924,565 B2 | 12/2014 | Lehr et al. |
| 8,930,413 B2 | 1/2015 | Tang et al. |
| 8,938,645 B2 | 1/2015 | Schlarb et al. |
| 8,949,789 B2 | 2/2015 | Schlarb et al. |
| 8,972,934 B2 | 3/2015 | Driesen et al. |
| 8,978,035 B2 | 3/2015 | McGrath et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,009,708 B2 | 4/2015 | Lu et al. |
| 9,015,212 B2 | 4/2015 | David et al. |
| 9,020,881 B2 | 4/2015 | Ritter et al. |
| 9,021,392 B2 | 4/2015 | Baeuerle et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,038,021 B2 | 5/2015 | Schlarb et al. |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,176,801 B2 | 11/2015 | Baeuerle et al. |
| 9,182,979 B2 | 11/2015 | Odenheimer et al. |
| 9,182,994 B2 | 11/2015 | Schlarb et al. |
| 9,183,540 B2 | 11/2015 | Eberlein et al. |
| 9,189,226 B2 | 11/2015 | Driesen et al. |
| 9,189,520 B2 | 11/2015 | May et al. |
| 9,223,985 B2 | 12/2015 | Eberlein et al. |
| 9,229,707 B2 | 1/2016 | Borissov et al. |
| 9,244,697 B2 | 1/2016 | Schlarb et al. |
| 9,251,183 B2 | 2/2016 | Mandelstein et al. |
| 9,256,840 B2 | 2/2016 | Said et al. |
| 9,262,763 B2 | 2/2016 | Peter et al. |
| 9,274,757 B2 | 3/2016 | Said et al. |
| 9,354,948 B2 | 5/2016 | Baeuerle et al. |
| 9,275,120 B2 | 6/2016 | Mayer et al. |
| 9,361,407 B2 | 6/2016 | Hutzel et al. |
| 9,378,233 B2 | 6/2016 | Lee et al. |
| 9,417,917 B1 | 8/2016 | Barber et al. |
| 9,430,523 B2 | 8/2016 | Falter et al. |
| 9,436,515 B2 | 9/2016 | Pohlmann |
| 9,442,977 B2 | 9/2016 | Falter et al. |
| 9,471,353 B1 | 10/2016 | Christopher et al. |
| 9,507,810 B2 | 11/2016 | Baeuerle et al. |
| 9,513,811 B2 | 12/2016 | Wein et al. |
| 9,575,819 B2 | 2/2017 | Baeuerle et al. |
| 9,590,872 B1 | 3/2017 | Jagtap et al. |
| 9,619,261 B2 | 4/2017 | Gaurav et al. |
| 9,619,552 B2 | 4/2017 | Falter et al. |
| 9,639,567 B2 | 5/2017 | Lee et al. |
| 9,639,572 B2 | 5/2017 | Hutzel et al. |
| 9,641,529 B2 | 5/2017 | Kovacs et al. |
| 9,724,757 B2 | 8/2017 | Barrett |
| 9,734,230 B2 | 8/2017 | Sarferaz |
| 10,248,336 B1 * | 4/2019 | Koujalagi ........... G06F 11/1438 |
| 10,346,434 B1 | 7/2019 | Morkel et al. |
| 10,482,080 B2 | 11/2019 | Auer et al. |
| 10,621,167 B2 | 4/2020 | Auer et al. |
| 10,657,276 B2 | 5/2020 | Birn et al. |
| 10,713,277 B2 | 7/2020 | Auer et al. |
| 10,733,168 B2 | 8/2020 | Schlarb et al. |
| 10,740,315 B2 | 8/2020 | Birn et al. |
| 10,740,318 B2 | 8/2020 | Auer et al. |
| 2005/0052150 A1 | 3/2005 | Bender |
| 2006/0248507 A1 | 11/2006 | Benjes et al. |
| 2006/0248545 A1 | 11/2006 | Benjes et al. |
| 2007/0060609 A1 | 3/2007 | Anderson et al. |
| 2007/0156650 A1 | 7/2007 | Becker |
| 2007/0156849 A1 | 7/2007 | Becker |
| 2007/0162512 A1 | 7/2007 | Kollar et al. |

(56) References Cited

U.S. PATENT DOCUMENTS

| | | |
|---|---|---|
| 2008/0059489 A1 | 3/2008 | Han et al. |
| 2008/0120129 A1 | 5/2008 | Seubert et al. |
| 2008/0162509 A1 | 7/2008 | Becker |
| 2008/0162536 A1 | 7/2008 | Becker et al. |
| 2008/0162660 A1 | 7/2008 | Becker |
| 2010/0030995 A1 | 2/2010 | Wang et al. |
| 2010/0070336 A1 | 3/2010 | Koegler et al. |
| 2010/0094882 A1 | 4/2010 | Lee |
| 2010/0153341 A1 | 6/2010 | Driesen et al. |
| 2010/0161648 A1 | 6/2010 | Eberlein et al. |
| 2010/0299664 A1 | 11/2010 | Taylor et al. |
| 2011/0173219 A1 | 7/2011 | Bent et al. |
| 2011/0295839 A1 | 12/2011 | Collins et al. |
| 2012/0036136 A1 | 2/2012 | Srivastava et al. |
| 2012/0041988 A1 | 2/2012 | Driesen |
| 2012/0166620 A1 | 6/2012 | Said et al. |
| 2012/0173488 A1 | 7/2012 | Spielberg et al. |
| 2012/0173581 A1 | 7/2012 | Hartig et al. |
| 2012/0174085 A1 | 7/2012 | Driesen et al. |
| 2012/0254221 A1 | 10/2012 | Lai et al. |
| 2012/0330954 A1 | 12/2012 | Sivasubramanian et al. |
| 2012/0331016 A1 | 12/2012 | Janson et al. |
| 2013/0086322 A1 | 4/2013 | Pelletier et al. |
| 2013/0132349 A1 | 5/2013 | Hahn et al. |
| 2013/0275509 A1 | 10/2013 | Micucci et al. |
| 2013/0282761 A1 | 10/2013 | Tamm et al. |
| 2013/0290249 A1 | 10/2013 | Merriman et al. |
| 2013/0325672 A1 | 12/2013 | Odenheimer et al. |
| 2013/0332424 A1 | 12/2013 | Nos et al. |
| 2014/0040294 A1 | 2/2014 | An et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0324917 A1 | 10/2014 | Haas et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0026131 A1 | 1/2015 | Schreter |
| 2015/0046413 A1 | 2/2015 | Mihnea et al. |
| 2015/0095283 A1 | 4/2015 | Kristoffersen et al. |
| 2015/0100546 A1 | 4/2015 | Eberlein et al. |
| 2015/0121545 A1 | 4/2015 | Chandrasekaran |
| 2015/0142730 A1 | 5/2015 | Dakshanamurthy et al. |
| 2015/0178332 A1 | 6/2015 | Said et al. |
| 2015/0242520 A1* | 8/2015 | Li .................. G06F 21/10 707/770 |
| 2015/0347410 A1 | 12/2015 | Kim et al. |
| 2015/0363167 A1 | 12/2015 | Kaushik |
| 2016/0147529 A1 | 5/2016 | Coleman et al. |
| 2016/0224594 A1 | 8/2016 | Chow et al. |
| 2016/0246864 A1 | 8/2016 | Boldt et al. |
| 2016/0358109 A1 | 12/2016 | Kruempelmann |
| 2016/0371315 A1 | 12/2016 | Kwon et al. |
| 2017/0025441 A1 | 1/2017 | Mori |
| 2017/0262638 A1 | 9/2017 | Horowitz et al. |
| 2018/0096165 A1 | 4/2018 | Warshavsky et al. |
| 2018/0150541 A1 | 5/2018 | Tyercha et al. |
| 2018/0189370 A1 | 7/2018 | Bendel et al. |
| 2019/0042660 A1 | 2/2019 | Brown et al. |
| 2019/0129985 A1 | 5/2019 | Schlarb |
| 2019/0129986 A1 | 5/2019 | Bim |
| 2019/0129988 A1 | 5/2019 | Auer |
| 2019/0129990 A1 | 5/2019 | Schlarb |
| 2019/0129991 A1 | 5/2019 | Auer et al. |
| 2019/0129997 A1 | 5/2019 | Auer |
| 2019/0130010 A1 | 5/2019 | Auer |
| 2019/0130121 A1 | 5/2019 | Birn |
| 2020/0257673 A1 | 8/2020 | Auer et al. |

OTHER PUBLICATIONS

Non-final office action issued in U.S. Appl. No. 15/794,368 dated Nov. 8, 2019, 14 pages.

Non-final office action issued in U.S. Appl. No. 15/794,261 dated Nov. 14, 2019, 48 pages.

Non-Final Office Action issued in U.S. Appl. No. 15/794,335 dated May 24, 2019, 33 pages.

Non-Final Office Action issued in U.S. Appl. No. 15/794,362 dated May 24, 2019, 33 pages.

U.S. Appl. No. 14/960,983, filed Dec. 7, 2015, Eberlein, et al.

U.S. Appl. No. 15/083,918, filed Mar. 29, 2016, Eberlein, et al.

U.S. Appl. No. 15/087,677, filed Mar. 31, 2016, Eberlein, et al.

U.S. Appl. No. 15/285,715, filed Oct. 5, 2016, Specht et al.

U.S. Appl. No. 15/593,830, filed May 12, 2017, Eberlein, et al.

Stefan Aulbach: "Schema Flexibility and Data Sharing in Multi-Tenant Databases", dated Dec. 5, 2011; 146 pages; retrieved from the Internet: URL: https://mediatum.ub.tun.de/doc/1075044/document.pdf [ retrieved on Dec. 21, 2017].

Zhi Hu Wang et al. "A Study and Performance Evaluation of the Multi-Tenant Data Tier Design Patterns for Service Oriented Computing", E-Business Engineering, 2008, ICEBE '08, IEEE International Conference on, Oct. 22, 2008, pp. 94-101, XP055453782.

Adaptive Server Et al. "Reference Manual: Commands", Jul. 31, 2012, XP055456066, Retrieved from the Internet: URL: http://infocenter.sybase.com/help/topic/com.sybase.inforcenter.dc36272.1572/pdf/commands.pdf [retrieved on Mar. 2, 2018].

Communication and European Search Report received in re to EOP application No. 17001902.0-1222, dated Jan. 8, 2018, 15 pages.

Communication and European Search Report received in re to EPO application No. 17001872.5-1222, dated Jan. 8, 2018, 16 pages.

Communication and extended European Search Report in re to EPO application No. 17001948.3-1222, dated Feb. 9, 2018, 8 pages.

Communication and extended European Search Report in re to EPO application No. 17001969.9-1217, dated Mar. 1, 2018, 11 pages.

Communication and extended European Search Report in re to EPO application No. 17001922.8-1217, dated Mar. 6, 2018, 12 pages.

Communication and extended European Search Report in re to EPO application No. 17001917.8-1217, dated Mar. 15, 2018, 9 pages.

Communication and extended European Search Report in re to EPO application No. 17001916.0-1217, dated Mar. 22, 2018, 10 pages.

EP Extended European Search Report in European Appln No. 17001049.0-1221, dated Jan. 11, 2018, 16 pages.

EP Extended European Search Report in European Appln. No. 18184931, dated Feb. 14, 2019, 13 pages.

Non-Final office action issued in U.S. Appl. No. 15/794,424 dated Dec. 17, 2019, 52 pages.

Non-Final office action issued in U.S. Appl. No. 15/794,501 dated Dec. 19, 2019, 49 pages.

Communication Pursuant to Article 94 (3) EPC issued in European Application No. 17001948.3 dated Aug. 26, 2020, 8 pages.

* cited by examiner

CHANGE MANAGEMENT FOR SHARED OBJECTS IN MULTI-TENANCY SYSTEMS

CROSS-REFERENCE TO RELATED APPLICATIONS

This application is a co-pending application of U.S. application Ser. No. 15/794,305, filed on Oct. 26, 2017 entitled "DATA SEPARATION AND WRITE REDIRECTION IN MULTI-TENANCY"; and is also a co-pending application of U.S. application Ser. No. 15/794,424, filed on Oct. 26, 2017 entitled "PATCHING CONTENT ACROSS SHARED AND TENANT CONTAINERS IN MULTI-TENANCY DATABASE SYSTEMS"; the entire contents of each and as a whole, are incorporated herein by reference in their entireties for all purposes.

BACKGROUND

A multi-tenancy software architecture can include a single instance of a software application that runs on a server and serves multiple tenants. A tenant is a group of users, or devices that share a common access to the software instance. In a multi-tenant architecture, the software application can be designed to provide every tenant a dedicated share of the instance—including tenant-specific data, configuration, user management, and tenant-specific functionality. Multi-tenancy can be used in cloud computing, and/or in relatively large on-premise landscapes.

SUMMARY

Implementations of the present disclosure are directed to data management in multi-tenancy architectures. More particularly, implementations of the present disclosure are directed to multi-tenant data sharing based on object attributes in multi-tenancy architectures.

In some implementations, actions include, in response to initiation of a deployment to a multi-tenant system, cloning a shared table in a shared container of a database system to provide a cloned table, the shared table corresponding to a plurality of table views in respective tenant containers, providing, within each tenant container of the tenant containers, an updated view to the cloned table, for a data object of the deployment, determining a previous location of the data object within the database system from an object catalog, and a new location of the data object within the database system from a deploy file, and storing the data object in one of the shared container, and a tenant container of a respective tenant based on one or both of the previous location, and the new location of the data object. Other implementations of this aspect include corresponding systems, apparatus, and computer programs, configured to perform the actions of the methods, encoded on computer storage devices.

These and other implementations can each optionally include one or more of the following features: in response to determining that the new location is in the shared container, storing the data object in the cloned table; actions further include deleting the data object from the tenant container; in response to determining that the new location is in the tenant container, and the previous location is the shared container, deleting the data object from the shared container, and storing the data object in the tenant container; in response to determining that the new location is in the shared container, and the previous location is in the shared container, maintaining the data object as stored in the cloned table; actions further include deleting the shared table in the shared container; and actions further include updating the object catalog based on storing of the data object.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for data management in multi-tenancy architectures. More particularly, implementations of the present disclosure are directed to multi-tenant data sharing based on object attributes in multi-tenancy architectures. Implementations can include actions of, in response to initiation of a deployment to a multi-tenant system, cloning a shared table in a shared container of a database system to provide a cloned table, the shared table corresponding to a plurality of table views in respective tenant containers, providing, within each tenant container of the tenant containers, an updated view to the cloned table, for a data object of the deployment, determining a previous location of the data object within the database system from an object catalog, and a new location of the data object within the database system from a deploy file, and storing the data object in one of the shared container, and a tenant container of a respective tenant based on one or both of the previous location, and the new location of the data object.

Figure 1:
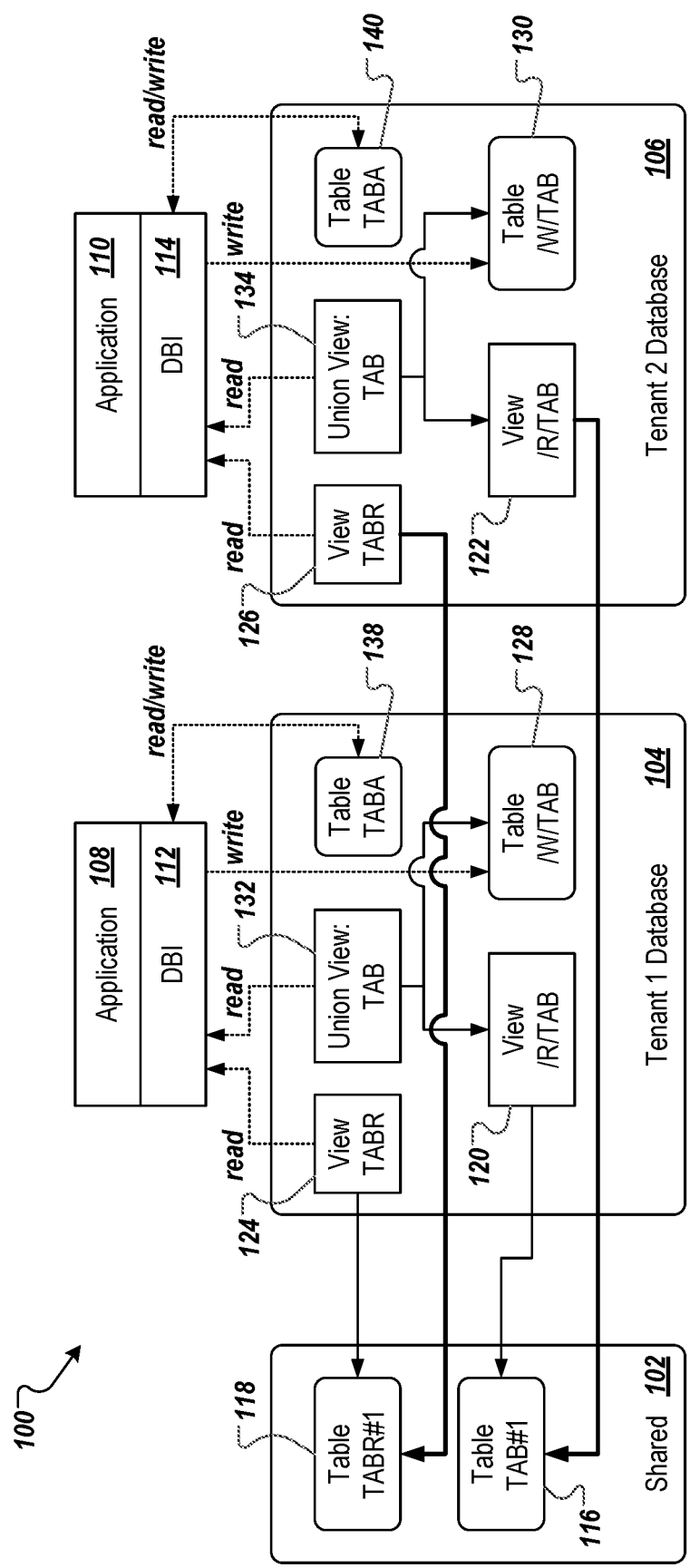
FIG. 1 depicts an example multi-tenancy architecture.

FIG. 1 depicts an example multi-tenancy architecture 100. In the depicted example, the multi-tenancy architecture 100 includes a shared database container 102, a first tenant database container 104 for a first tenant, and a second tenant database container 106 for a second tenant. A first application 108, and a second application 110 handle application requests for the first tenant and the second tenant, respectively. The first tenant and the second tenant can be served by separate application servers, a same application server, or by multiple application servers. The first application 108 communicates with the first tenant database container 104 through a database interface (DBI) 112, and the second application 110 communicates with the second tenant database container 106 through a DBI 114.

Although the example of FIG. 1 depicts a two-tenant multi-tenancy architecture, it is contemplated that implementations of the present disclosure can be realized with any appropriate number of tenants.

In the depicted example, the shared database container 102 includes shared read-only tables 116, 118 that each include read-only content. The shared read-only tables 116, 118 are made available as a shared table to the first and second tenants, and other tenants. The first application 108 and the second application 110 can access the shared read-only table 116 using a view 120, and a view 122, respectively. The first application 108 and the second application 110 can have read, but not write access, to the shared read-only table 116 through the view 120, or the view 122, respectively. The first application 108 and the second application 110 can access the shared read-only table 118 using a view 124, and a view 126, respectively. The first application 108 and the second application 110 can have read, but not write access, to the shared read-only table 118 through the view 124, or the view 126, respectively.

The first tenant database container 104 and the second tenant database container 106 respectively include writable tables 128, 130. The writable tables 128, 130 are tenant-specific, not-shared, and store records that have been respectively written by the application 108, or the application 110, respectively. The first tenant does not have access to the writable table 130, and the second tenant does not have access to the writable table 128.

The first tenant database container 104 and the second tenant database container 106 include a union view 132, and a union view 134, respectively. In the depicted example, the union view 132 provides read-only access to a combined view of the shared read-only table 116 (e.g., through the view 120), and the writable table 128. In the depicted example, the union view 134 provides read-only access to a combined view of the shared read-only table 116 (e.g., through the view 122), and the writable table 130.

The first tenant database container 104 and the second tenant database container 106 respectively include read-/writable tables 138, 140. The read-/writable tables 138, 140 are tenant-specific, not-shared, and store records that have been written by the application 108, or the application 110, respectively. The first tenant does not have access to the read-/writable table 140, and the second tenant does not have access to the read-/writable table 138.

The application 108 can be provided as a single point of access for the mixed-table records that are split between the shared read-only table 116, and the writable table 128 using the union view 132. Similarly, the application 110 can be provided as a single point of access for the mixed-table records that are split between the shared read-only table 116 and the writable table 130 using the union view 134. In some examples, a write request for a TAB table submitted by the application 108 or the application 110 could be intercepted by the respective DBI 112,114, and redirected to the writable table 128, or the writable table 130, respectively.

Implementations of the present disclosure are described in further detail herein with reference to an example multi-tenant system. The example multi-tenant system includes an SAP Application Server, provided by SAP SE of Walldorf, Germany that executes application instances for respective tenants. The example multi-tenant system also includes a SAP HANA Database System, provided by SAP SE of Walldorf, Germany, which can provide a shared container, and multiple, respective tenant containers in multi-tenancy architectures. It is contemplated, however, that implementations of the present disclosure can be realized in any appropriate multi-tenant system.

To provide further context for implementations of the present disclosure, in multi-tenancy architectures, such as the example of FIG. 1, resources are shared between applications from different tenants. Multi-tenancy enables sharing of resources (shared resources) between multiple application instances (optimized use of resources), and enables central software change management for events such as patching, or software upgrade (optimized software change management). Example shared resources include, without limitation, computer-executable code, application documentation, and central runtime and configuration data. Multi-tenancy implies that the data to-be-shared, and the tenant-individual-data is to be separated (content separation) (e.g., as described above with respect to FIG. 1).

Content separation and resource sharing are targeted to cloud deployments, but can also be beneficial for large system landscapes (e.g., an enterprise having multiple systems, and tenants within the enterprise). For example, an enterprise can operate a development system, a test system, and a production system for each of their factories, regions, and/or units. This can result in system landscapes of dozens to hundreds of systems that often share the same software stack and version. In either case, cloud deployments, or system landscape deployments, the shared container (e.g., the shared container 102 of FIG. 1) is used by several tenants. Each tenant can create views to read the shared tables. The tenants only have read-access to the shared tables, but do not have access rights on any other tenant container.

In some instances, the application server (e.g., SAP ABAP application server) includes an object catalog, which can be provided as a database table, for example (e.g., TADIR in SAP ABAP). The object catalog maintains a list of objects stored in the database system (e.g., SAP HANA), and stores metadata about the objects. Example metadata includes, without limitation, the object name, type, package, and the like. The object catalog is available for the objects being delivered from a vendor to the enterprise (customer) systems, as well as objects created by the enterprise. This approach is used for a large variety of object types. Example object types can include, without limitation, repository objects (e.g., reports, classes, database table definitions, user interface (UI) elements), and customized objects (e.g., application-specific defined objects, security roles).

A non-limiting, example object catalog specifies the object type (e.g., in fields PGMID (program identifier) and OBJECT (object type)), and object name (e.g., in field OBJ_NAME) as a key. The example catalog also provides additional information about the object (e.g., developer name, the package the object is stored in, the software component that the object belongs to, one or more parameters). In some instances, a deployment tool (e.g., tp and R3trans in SAP ABAP systems) uses the object types as a granularity for deployment. An object is persisted in a set of tables. The term deployment refers to the deployment tools writing objects to the database, and calling a post processing action that is specific to an object type. The objects are also entered in the object catalog. When deploying an object, the deployment tools write the object catalog entry, and write the object to the object persistency tables. For each deployed object, it is determined as to which container the object is written to: shared, or tenant. The deployment can include content shipped by the vendor, and/or content created by an enterprise in another system.

Multiple problems can arise in deployment of objects to the database system. As one example, an object should only be stored once in the database system as a whole (including the shared container and the tenant container). That is, the database system should not store duplicate objects. For example, if an object is stored in a shared container, and a tenant container, the application server would receive multiple results for an object select. To address this, a priority mechanism would have to be defined to determine the object that is to be returned to the application server. Further, upon deletion of one object, the other object may appear again. This is non-standard behavior that is to be avoided in the database system. Overlay logic should be managed on a higher layer software, not generically in the database system to keep the expected, standard behavior for application developers (e.g. that an object is gone, when deleted and not that an older version appears again).

As another example, a deployment to the database system can include content to store in the shared container, as well as content to be deployed to a tenant container. In some examples, vendor-provided content can be modified by a tenant, and stored in the respective tenant container. For example, for generated code, a default generated object can be delivered, which can be re-generated at the tenant container. The tenant can tailor the default generated object to its needs within the tenant container. Such objects need to be deployed in the tenant container, otherwise the object generation would create another record with the same name as stored in the shared container, and duplicate records would be created.

In view of these and other problems, implementations of the present disclosure use the object catalog to define where objects (data objects) are stored. More particularly, an object identified in the object catalog can be assigned an attribute in the object catalog that specifies whether the object is stored in a shared container, or in a tenant container (e.g., object location=S(HARED)/T(ENANT) (field GENFLAG in TADIR)). In some implementations, objects created by the vendor (e.g., vendor-deployed objects) are assigned the value S (shared) or T (tenant) as the object location attribute. The objects are deployed to shared container, or tenant container, respectively. Objects created by the customer are assigned the value T (tenant) as the object location attribute. In some examples, upon creation of an object, the database system verifies that the object name is not already used. In some examples, objects in the shared container cannot be modified or deleted.

In some implementations, a tenant can modify objects in their tenant container (e.g., using an object generator). In some examples, objects in the tenant container can be modified, even if the objects had been shipped by the vendor (e.g., as vendor-provided objects). In some examples, the object generator stores the object identifier to record that the object has been generated in the database system. This enables objects to be re-generated upon a deployment. In some examples, the object generator reads system configuration data to create the object, but does not directly interact with the tenant in object generation.

In some implementations, if the object location attribute changes with a deployment, the deployment tool deploys the object to the designated container, and deletes the object from the non-designated container. In some implementations, if the object is generated by the tenant, the object generator is called again, when the object is deployed to the tenant container.

As described in detail herein, implementations of the present disclosure provide for management of a shared container (e.g., the shared container 102 of FIG. 1), and several tenant containers (e.g., the multi-tenant containers 104, 106 of FIG. 1) in multi-tenant architectures. In some implementations, the shared container includes one or more tables with content (referred to as TC #0), and the shared container contains one or more tables with source code (referred to as TS #0). In some examples, the tenants read the shared container table with content TC #0 using a view TC, and with the source code TS #0 using a view TS. In some implementations, the application server of the tenants have a runtime cache of the table TC #0 content. In some examples, the application server of the tenants compile source code, and store a load of the compiled code.

In accordance with implementations of the present disclosure, a change can be deployed to the multi-tenant architecture. In some examples, the deployment to the shared container includes cloning the table TC #0 is cloned to a table TC #1. That is, a copy of the table TC #0 is generated in the shared container as the table TC #1. The content of TC #0 is written to TC #1. At this point, redundant content tables are provided in the shared container. Further, the source code table TS #0 is cloned to a table TS #1, the source code of the table TS #0 is written to the table TS #1. In some implementations, modified records in TC #1 and TS #1 are stored to be read in the tenant deployment.

A change deployment is performed in the tenant container (e.g., a first tenant container of multiple tenant containers). In some implementations, the view TC is dropped, and is newly created to read from TC #1. The modified records are read in the table TC #1, and the corresponding entries are deleted in the cache of the application server. In some implementations, the view TS is dropped, and is newly created to read from TS #1. The modified records are read in the table TS #1, and the compiled code for these entries are deleted from the load store of the application server. This process is repeated for each of the other tenants (e.g., first tenant, second tenant).

After all tenants in the database system are processed, the shared container is cleaned up. That is, because all views in tenants to the shared container read from TC #1, or TS #1, the old tables TC #0, and TS #0 can be dropped. Consequently, the tables TC #0, and TS #0 are deleted from the shared container.

In accordance with implementations of the present disclosure, changes in the shared container are not visible in the tenant container, unless an action in the tenant container is performed. In some implementations, when an action in the tenant reads from the changed content in the shared container, the application server buffer, and the compiled content are invalidated, and the new content is read from the shared container.

Figure 2:
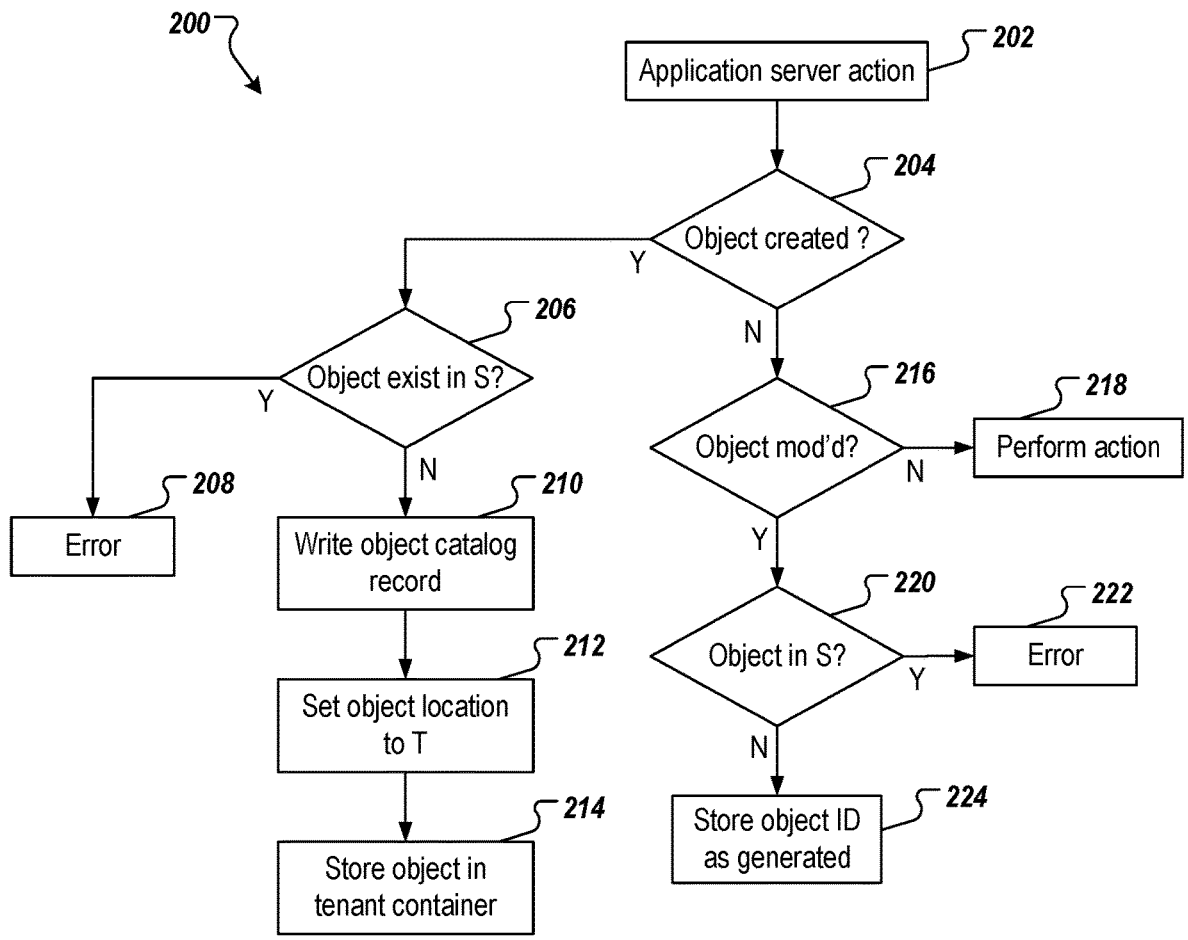
FIGS. 2-4 depict example processes that can be executed in accordance with implementations of the present disclosure.
Figure 3:
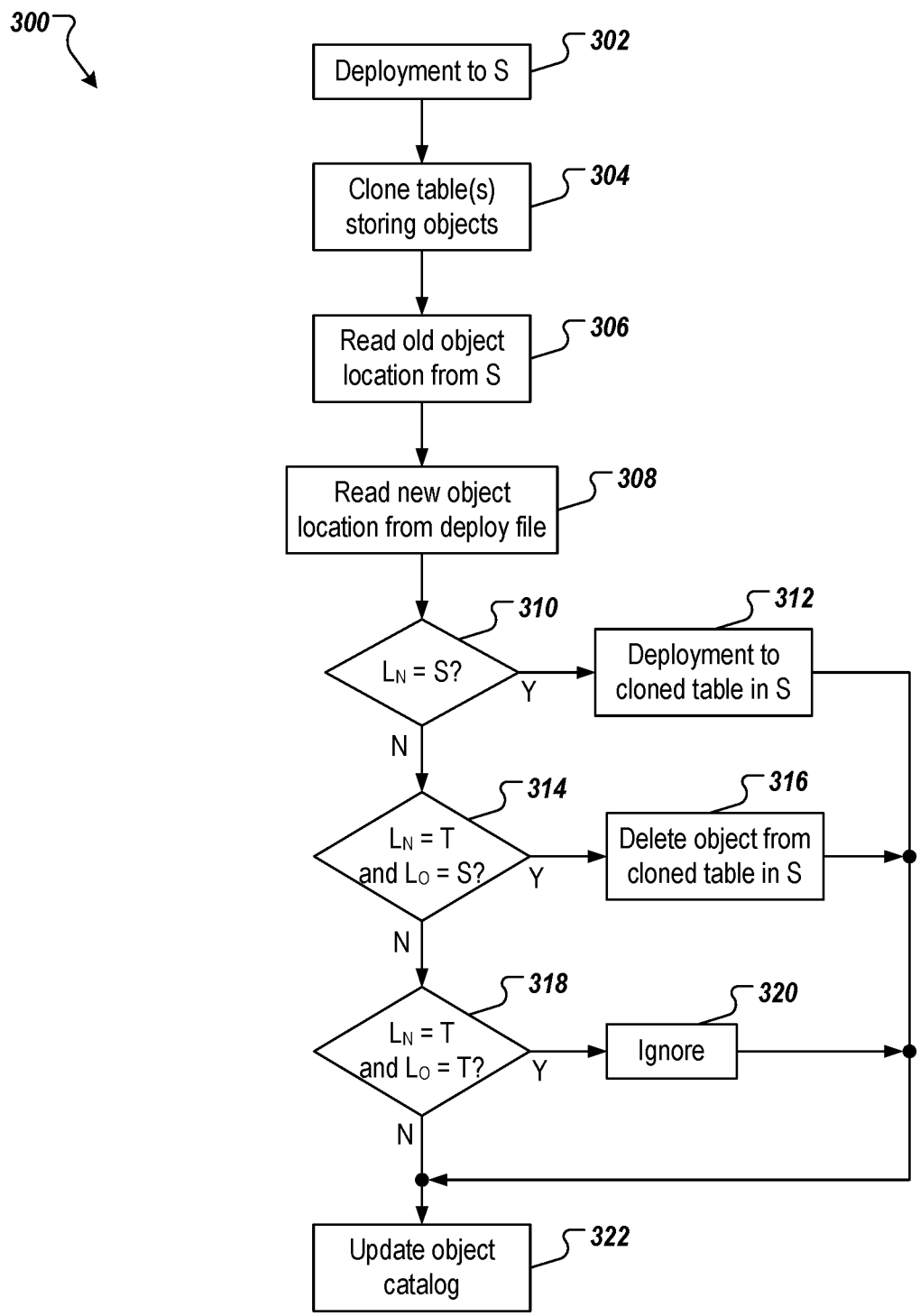
Figure 4:
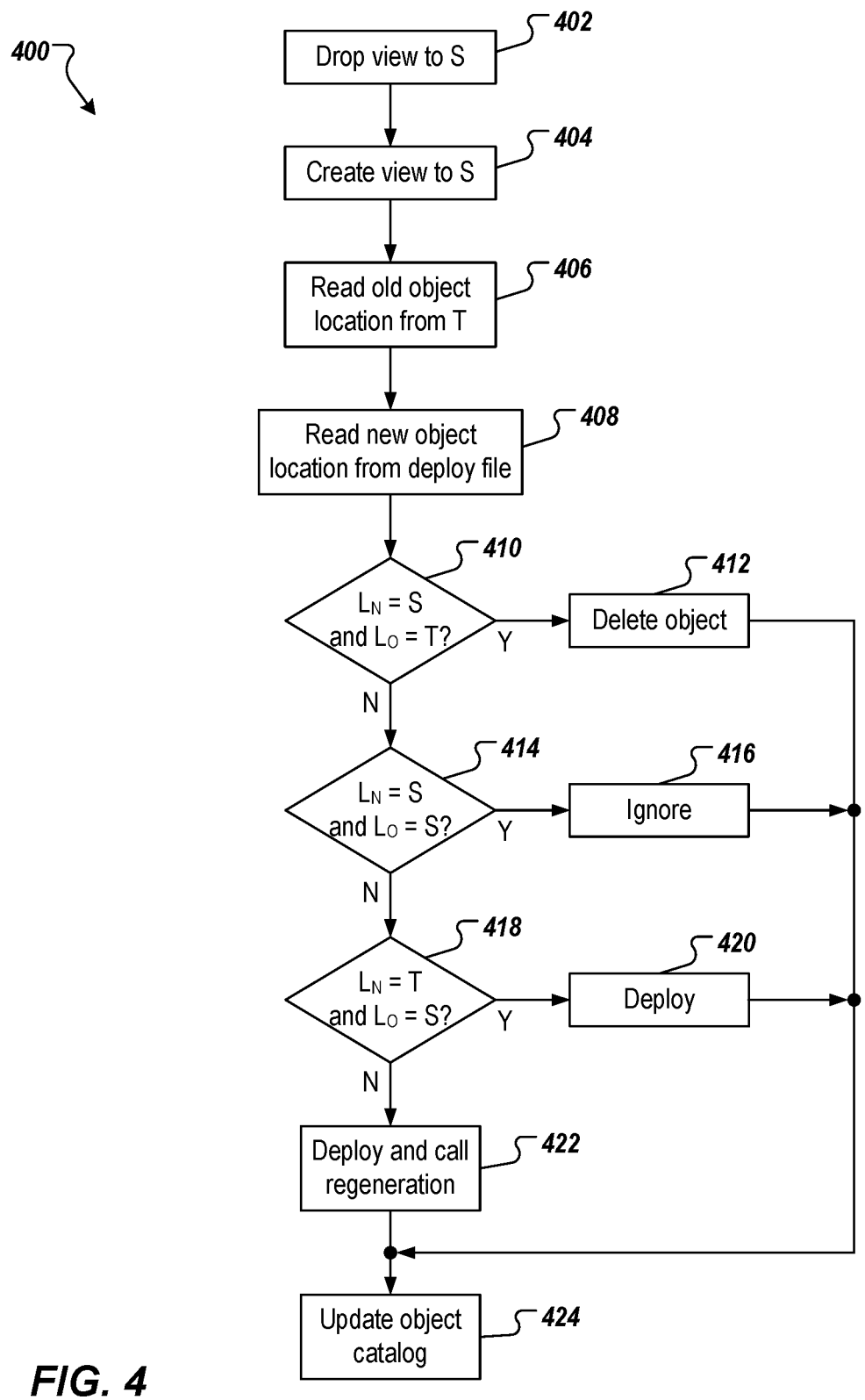

FIGS. 2, 3, and 4 depict example processes 200, 300, 400, respectively, that can be executed in accordance with implementations of the present disclosure. In some examples, the example processes 200, 300, 400 can be provided by one or more computer-executable programs executed using one or more computing devices. In some examples, the example processes 200, 300, 400 is associated with a delta deployment (e.g., a patch, a new version). In some examples, the delta deployment can include deployment of an object to a shared container, or a tenant container. In some examples, the delta deployment and can include moving an object from a shared container to a tenant container, or from a tenant container to a shared container.

The example process 200 of FIG. 2 corresponds to customer (tenant) usage of the database system in a multi-tenant architecture. An action associated with the application server is performed (202). For example, a user can issue an action through the application server and corresponding DBI, and the action is to be performed in the database system. Example actions can include, without limitation, a query, creation of a new object, and modification of an existing object. It is determined whether an object is to be created (204). For example, the action can be evaluated to determine whether the action corresponds to creation of an object.

If an object is to be created, it is determined whether the object already exists in the shared container (206). For example, the object identifier is cross-referenced with an object catalog to determine whether the object already exists in the shared container. If the object already exists in the shared container, an error is issued (208). That is, a duplicate object cannot be created in the database system. In some examples, an error message can be provided to the user indicating that the object cannot be created. If the object does not already exist, the object is created, and a record corresponding to the object is written to the object catalog (210). The object location is set to tenant (T) (212), and the object is stored in the tenant container (214) of the respective tenant.

If an object is not to be created, it is determined whether the object is to be modified (216). For example, it can be determined whether the action corresponds to a change to an existing object. If the object is not to be modified, the action can be performed (218). For example, the action can include a query requiring a view on one or more tables. The view can be performed, and a result returned to the application server through the respective DBI.

If an object is to be modified, it is determined whether the object exists in the shared container (220). For example, the location attribute of the object can be determined from an object catalog. If the object resides in the shared container, an error is issued (222). For example, because the object is a shared object, the object cannot be modified by the tenant. If the object does not reside in the shared container, the object is modified, and the object identifier is stored as generated. In some examples, the object can be subsequently re-generated upon a call to a generator program, which reads the stored object identifier.

The example process 300 of FIG. 3 corresponds to deployment to a shared container of the database system in a multi-tenant architecture. In some examples, at least part of the example process 300 is performed for each object that is included in a deployment.

A deployment to the shared container is initiated (302). For example, a user, or a deployment tool triggers deployment including a deploy file to the shared container. A table that store objects in the shared container is cloned (304). For example, and as described above, a table TS #0 is cloned to TS #1. The old object location (Lo) is read from the shared container (306). For example, the object catalog is referenced to determine a previous location of an object (e.g., shared, or tenant) that is to be deployed to the shared container as part of the deployment. A new object location ($L_N$) is read from the deploy file (308).

It is determined whether the new object location is to the shared container (310). If the new object location is to the shared container, the object is deployed to the cloned table (e.g., TS #1). If the new object location is to the shared container, it is determined whether the new object location is to the tenant container, and the old object location is to the shared container. If the new object location is to the tenant container, and the old object location is to the shared container, the object is deleted from the cloned table (e.g., TS #1), and is written to the respective tenant container (316).

If the new object location is not to the tenant container, and/or the old object location is not to the shared container, it is determined whether the new object location is to the tenant container, and the old object location is to the tenant container (or the object is not found in the object store in the shared container) (318). If the new object location is to the tenant container, and the old object location is to the tenant container (or the object is not found in the object store in the shared container), the object is ignored (320). If the new object location is not to the tenant container, and/or the old object location is not to the tenant container (and/or the object is found in the object store in the shared container), the object catalog in the shared container is updated (322).

The example process 400 of FIG. 4 corresponds to deployment to a shared container of the database system in a multi-tenant architecture. In some examples, the example process 400 is performed for each tenant in the multi-tenancy architecture as part of the deployment.

A view to a shared table in the shared container is dropped (402), and a new view to a cloned shared table in the shared container is created (404). For example, a view to the table TS #0 is dropped, and a view to the table TS #1 is created. The old object location (Lo) is read from the shared container (406). For example, the object catalog is referenced to determine a previous location of an object (e.g., shared, or tenant) that is to be deployed to the shared container as part of the deployment. A new object location ($L_N$) is read from the deploy file (408).

It is determined whether the new object location is in the shared container, and the old object location is in the tenant container (410). If the new object location is in the shared container, and the old object location is in the tenant container, the object is deleted from the tenant container (412). If the new object location is in the shared container, and/or the old object location is not in the tenant container, it is determined whether the new object location is in the shared container, and the old object location is in the shared container (414). If the new object location is in the shared container, and the old object location is in the shared container, the object is ignored (416).

If the new object location is not in the shared container, and/or the old object location is not in the shared container, it is determined whether the new object location is in the tenant container, and the old object location is in the shared container (418). If the new object location is in the tenant container, and the old object location is in the shared container, the object is deployed to the tenant container (420). If the new object location is in the tenant container, and the old object location is in the shared container, the new object location is in the tenant container, and the old object location is in the tenant container. Consequently, the object is deployed to the tenant container, and regeneration of the object is called (422). In some examples, regeneration is not necessarily available for all objects. Whether the object is regenerated defined by the generation program. In some examples, the generation program will overwrite the deployed version with the newly generated version, and store the object identifier as generated. The object catalog in tenant is updated (420). The old table storing the objects in the shared container (e.g., TS #0) is dropped (e.g., deleted).

Implementations of the present disclosure also address the object buffer of the application server, and object load invalidation. In some implementations, table buffer/cache can be invalidated for all tables that had been cloned in the shared container, and views are dropped/created to point to the new shared table. In some implementations, the object buffer/cache can be invalidated for all objects, where at least one table in the shared container had been cloned, and the view is dropped/created to point to the new shared table. For large buffered tables, this buffer invalidation mechanism can have a higher than necessary impact on the runtime in the application server. For example, the content for invalidated buffers has to be re-read from the database system instead of reading from the internal table buffer of the application server. Accordingly, this invalidation approach may not be practical, as the re-compile of all loads can take hours, and the performance of the system is degraded (significantly, if too many reports have to be re-compiled).

In view of this, implementations can include executing the buffer invalidation for each record that had been deployed to the shared container in a cloned table. For example, the object is deployed to the shared container, and the object is not deployed to tenant, but the buffer invalidation is called in the tenant container. This is either read from the deploy file, or from a synchronization table that is written in the shared container for every table and key changed in the import to the shared container.

For load invalidation, and in the shared container, the table holding the code is cloned. The application server still reads from the original table, while the new/modified sources are read from the deploy file, and written to the cloned table. In the tenant container, new/modified sources are read from the deploy file, and the respective compiled loads are invalidated. Upon the next call to the report, the code is compiled, and an asynchronous process compiles the code of invalidated loads.

Figure 5:
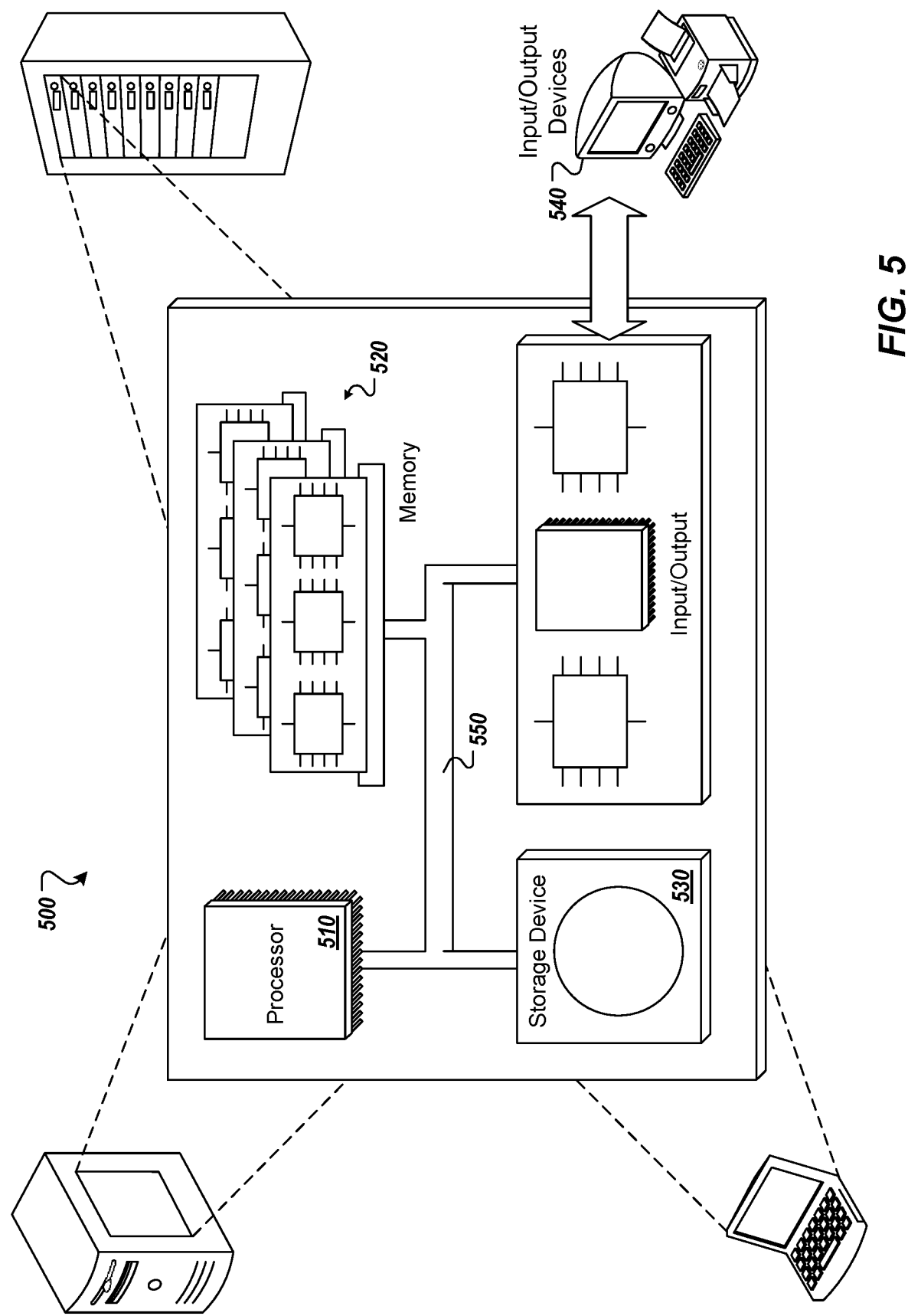
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for multi-tenant data sharing in multi-tenancy architectures, the method being executed by one or more processors and comprising:
   in response to initiation of a deployment to a multi-tenant system serving multiple tenants, cloning a shared table in a shared container of a database system to provide a cloned table, the shared table available to each of the multiple tenants and corresponding to a plurality of table views in respective tenant containers, wherein each tenant container includes content for a respective tenant and wherein the deployment includes first content to store in the shared container and second content to be deployed to the tenant containers;
   providing, within each tenant container of the tenant containers, an updated view to the cloned table;
   for a data object of the deployment, determining a previous container location of the data object within the database system from an object catalog, and a new container location of the data object within the database system from a deploy file, wherein the previous container location and the new container location are selected from one of the shared container and the tenant containers, the new container location is different from the previous container location, and the new container location being different from the previous container location indicates that the data object is to be moved, during the deployment, from the previous container location to the new container location; and
   changing the location of the data object by storing the data object in one of the shared container, and a tenant container of a respective tenant based on one or both of the previous container location, and the new container location of the data object.

2. The method of claim 1, wherein, in response to determining that the new location is in the shared container, storing the data object in the cloned table.

3. The method of claim 2, further comprising, deleting the data object from the tenant container.

4. The method of claim 1, wherein, in response to determining that the new location is in the tenant container, and the previous location is the shared container, deleting the data object from the shared container, and storing the data object in the tenant container.

5. The method of claim 1, wherein, in response to determining that the new location is in the shared container, and the previous location is in the shared container, maintaining the data object as stored in the cloned table.

6. The method of claim 1, further comprising deleting the shared table in the shared container.

7. The method of claim 1, further comprising updating the object catalog based on storing of the data object.

8. A non-transitory computer-readable storage medium coupled to one or more processors and having instructions stored thereon which, when executed by the one or more processors, cause the one or more processors to perform operations for multi-tenant data sharing in multi-tenancy architectures, the operations comprising:
   in response to initiation of a deployment to a multi-tenant system serving multiple tenants, cloning a shared table in a shared container of a database system to provide a cloned table, the shared table available to each of the multiple tenants and corresponding to a plurality of table views in respective tenant containers, wherein each tenant container includes content for a respective tenant and wherein the deployment includes first content to store in the shared container and second content to be deployed to the tenant containers;
   providing, within each tenant container of the tenant containers, an updated view to the cloned table;
   for a data object of the deployment, determining a previous container location of the data object within the database system from an object catalog, and a new container location of the data object within the database system from a deploy file, wherein the previous container location and the new container location are selected from one of the shared container and the tenant containers, the new container location is different from the previous container location, and the new container location being different from the previous container location indicates that the data object is to be moved, during the deployment, from the previous container location to the new container location; and
   changing the location of the data object by storing the data object in one of the shared container, and a tenant container of a respective tenant based on one or both of the previous container location, and the new container location of the data object.

9. The computer-readable storage medium of claim 8, wherein, in response to determining that the new location is in the shared container, storing the data object in the cloned table.

10. The computer-readable storage medium of claim 9, wherein operations further comprise deleting the data object from the tenant container.

11. The computer-readable storage medium of claim 8, wherein, in response to determining that the new location is in the tenant container, and the previous location is the shared container, deleting the data object from the shared container, and storing the data object in the tenant container.

12. The computer-readable storage medium of claim 8, wherein, in response to determining that the new location is in the shared container, and the previous location is in the shared container, maintaining the data object as stored in the cloned table.

13. The computer-readable storage medium of claim 8, wherein operations further comprise deleting the shared table in the shared container.

14. The computer-readable storage medium of claim 8, wherein operations further comprise updating the object catalog based on storing of the data object.

15. A system, comprising:
   a computing device; and a computer-readable storage device coupled to the computing device and having instructions stored thereon which, when executed by the computing device, cause the computing device to perform operations for multi-tenant data sharing in multi-tenancy architectures, the operations comprising:

in response to initiation of a deployment to a multi-tenant system serving multiple tenants, cloning a shared table in a shared container of a database system to provide a cloned table, the shared table available to each of the multiple tenants and corresponding to a plurality of table views in respective tenant containers, wherein each tenant container includes content for a respective tenant and wherein the deployment includes first content to store in the shared container and second content to be deployed to the tenant containers;

providing, within each tenant container of the tenant containers, an updated view to the cloned table;

for a data object of the deployment, determining a previous container location of the data object within the database system from an object catalog, and a new container location of the data object within the database system from a deploy file, wherein the previous container location and the new container location are selected from one of the shared container and the tenant containers, the new container location is different from the previous container location, and the new container location being different from the previous container location indicates that the data object is to be moved, during the deployment, from the previous container location to the new container location; and changing the location of the data object by storing the data object in one of the shared container, and a tenant container of a respective tenant based on one or both of the previous container location, and the new container location of the data object.

16. The system of claim 15, wherein, in response to determining that the new location is in the shared container, storing the data object in the cloned table.

17. The system of claim 16, wherein operations further comprise deleting the data object from the tenant container.

18. The system of claim 15, wherein, in response to determining that the new location is in the tenant container, and the previous location is the shared container, deleting the data object from the shared container, and storing the data object in the tenant container.

19. The system of claim 15, wherein, in response to determining that the new location is in the shared container, and the previous location is in the shared container, maintaining the data object as stored in the cloned table.

20. The system of claim 15, wherein operations further comprise deleting the shared table in the shared container.

* * * * *